US010850842B2

United States Patent
Chang et al.

(10) Patent No.: US 10,850,842 B2
(45) Date of Patent: Dec. 1, 2020

(54) UNMANNED AERIAL VEHICLE AND METHOD USING THE SAME

(71) Applicant: NATIONAL CHIAO TUNG UNIVERSITY, Hsinchu (TW)

(72) Inventors: Mau-Chung Frank Chang, Hsinchu (TW); Chiun-Hsun Chen, Hsinchu (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 401 days.

(21) Appl. No.: 16/027,279

(22) Filed: Jul. 4, 2018

(65) Prior Publication Data

US 2019/0016461 A1   Jan. 17, 2019

Related U.S. Application Data

(60) Provisional application No. 62/533,137, filed on Jul. 17, 2017.

(51) Int. Cl.
| | |
|---|---|
| *B64C 39/02* | (2006.01) |
| *B64B 1/02* | (2006.01) |
| *B64C 27/08* | (2006.01) |
| *B64C 27/52* | (2006.01) |
| *B64B 1/64* | (2006.01) |

(52) U.S. Cl.
CPC .............. *B64C 39/024* (2013.01); *B64B 1/02* (2013.01); *B64B 1/64* (2013.01); *B64C 27/08* (2013.01); *B64C 27/52* (2013.01); *B64B 2201/00* (2013.01); *B64C 2201/022* (2013.01); *B64C 2201/024* (2013.01)

(58) Field of Classification Search
CPC ......... B64B 1/02; B64B 1/64; B64B 2201/00; B64B 1/14; B64C 2201/022; B64C 2201/101
See application file for complete search history.

(56) References Cited

U.S. PATENT DOCUMENTS

| | | | | |
|---|---|---|---|---|
| 7,261,255 B2 * | 8/2007 | Li | ............................ | B64B 1/04 244/125 |
| 9,669,917 B2 * | 6/2017 | Heppe | ....................... | B64B 1/62 |
| 9,852,644 B2 * | 12/2017 | Salnikov | .............. | G08G 5/0043 |
| 9,938,001 B1 * | 4/2018 | Parent | ................... | B64C 39/024 |
| 10,246,186 B1 * | 4/2019 | Beckman | ................. | B64C 27/08 |

\* cited by examiner

*Primary Examiner* — Brian M O'Hara
(74) *Attorney, Agent, or Firm* — CKC & Partners Co., LLC

(57) ABSTRACT

An unmanned aerial vehicle (UAV) includes a body, a plurality of rotated propulsion systems, and at least one air bag. The rotated propulsion systems are connected to the body and each includes a blade and an actuator configured to actuate the blade. The air bag is disposed on the body.

17 Claims, 16 Drawing Sheets

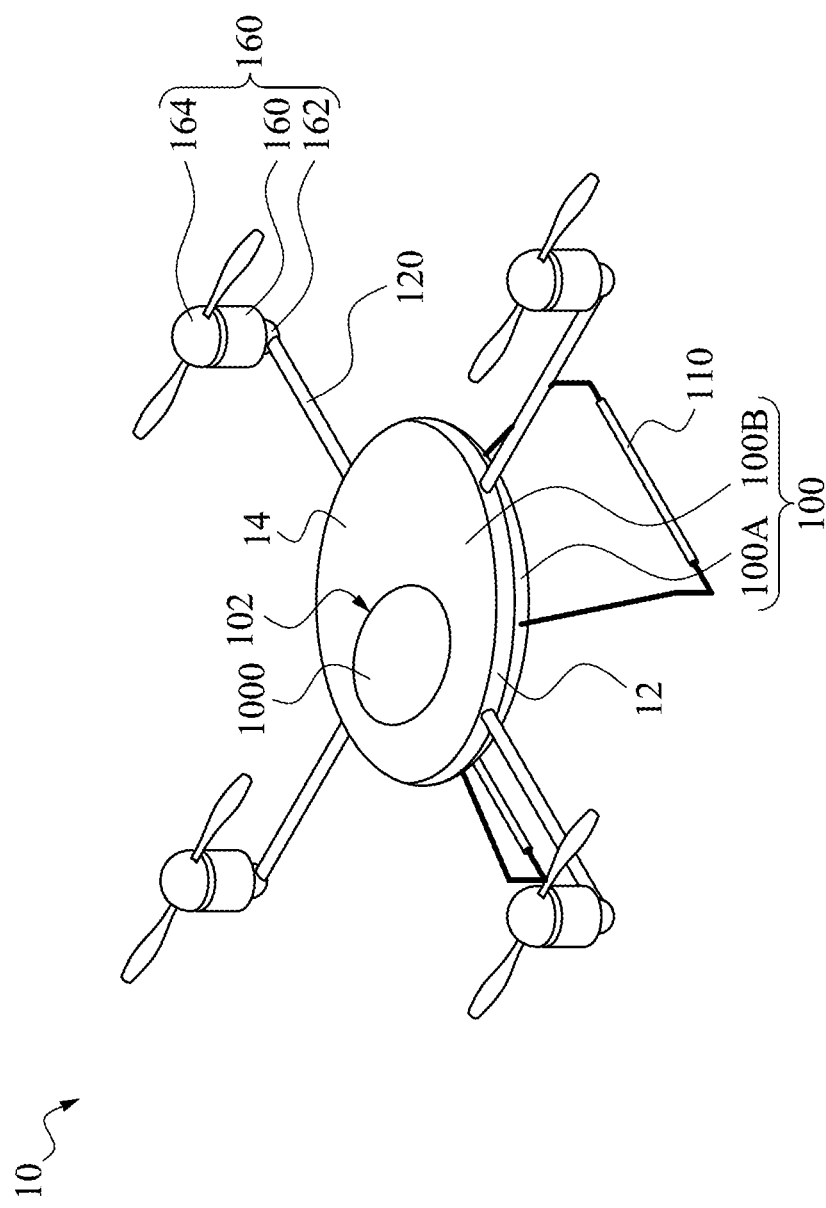

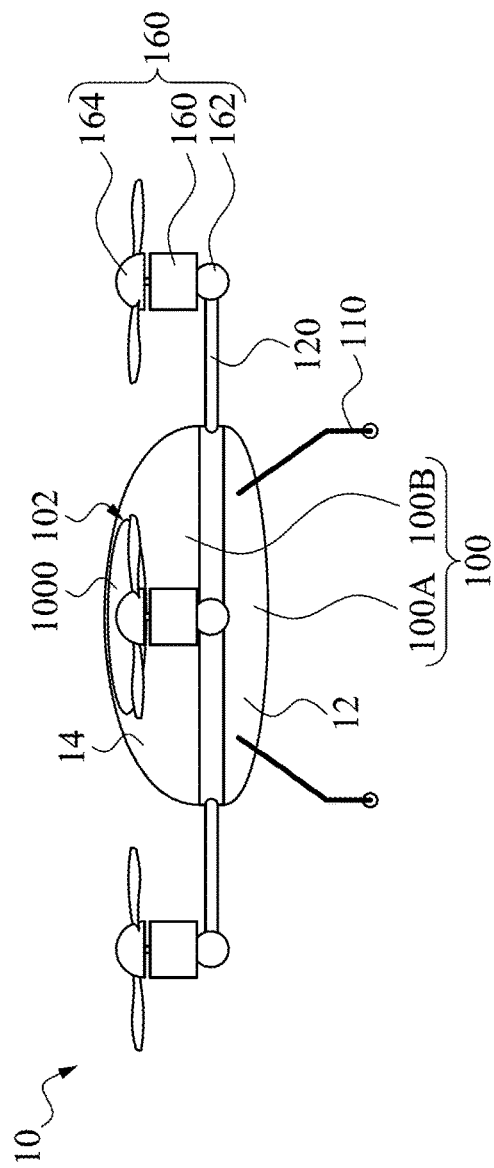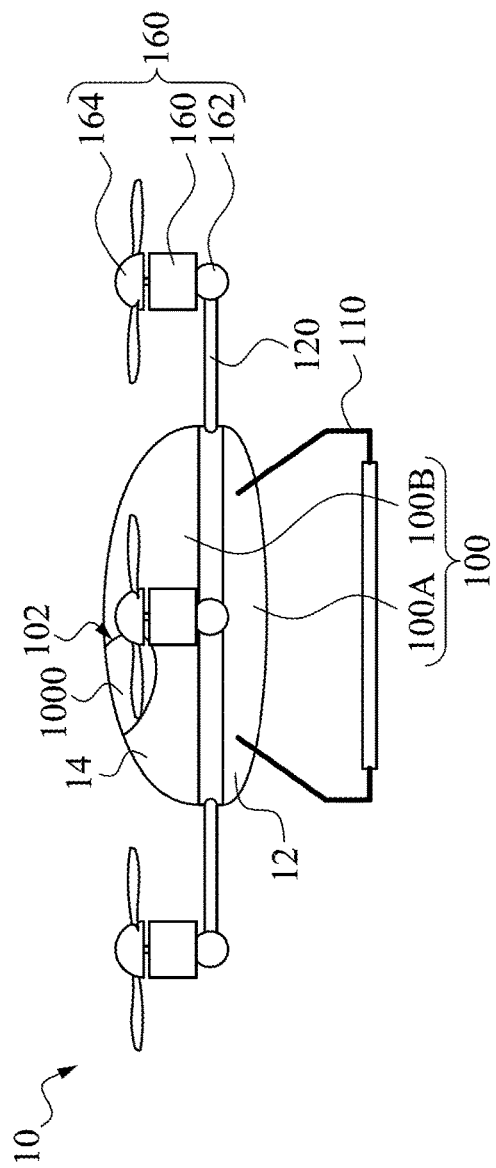
Fig. 2A
Fig. 2B

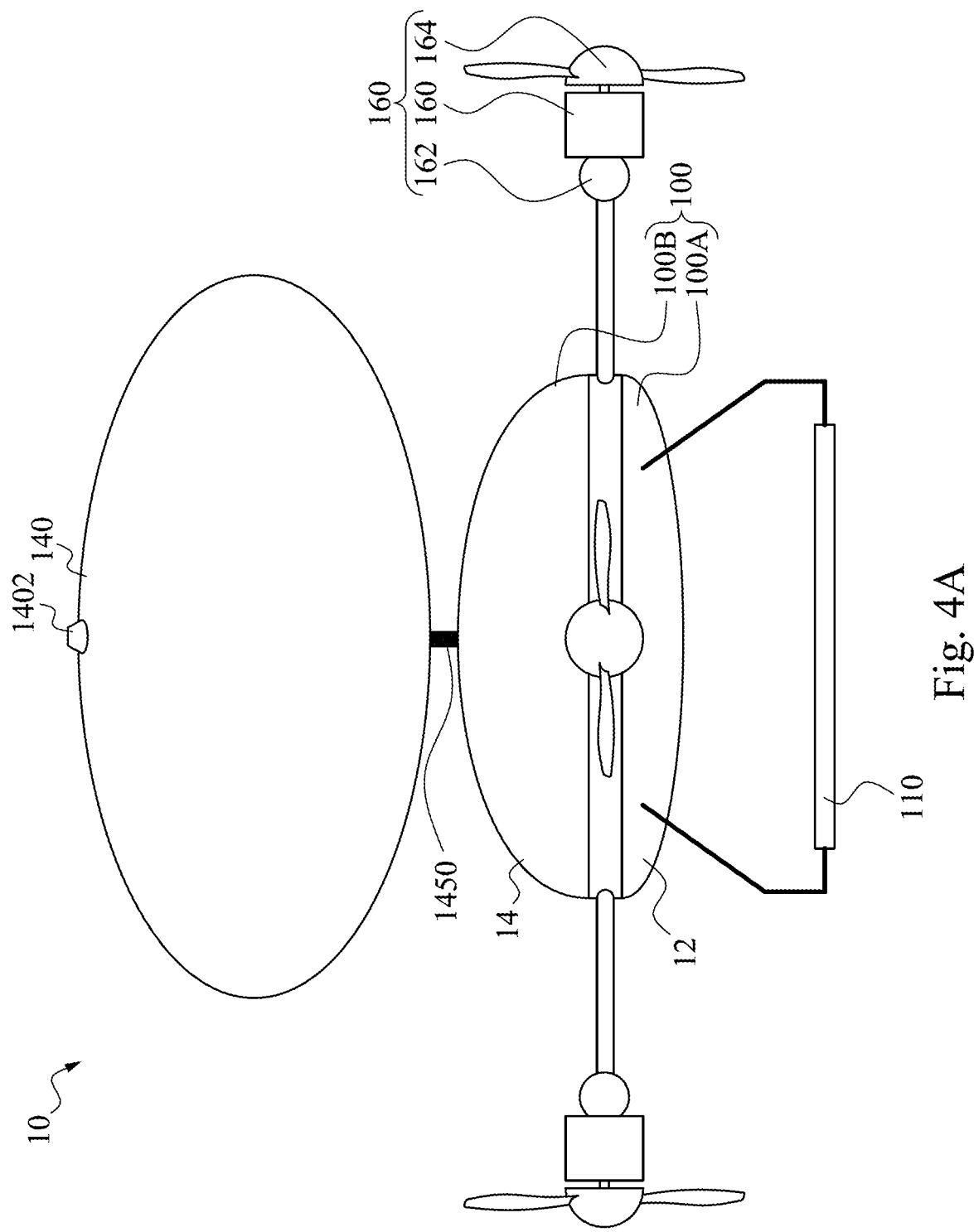

UNMANNED AERIAL VEHICLE AND METHOD USING THE SAME

CROSS-REFERENCE TO RELATED APPLICATION

This application claims priority to U.S. Provisional Application Ser. No. 62/533,137, filed Jul. 17, 2017, which is herein incorporated by reference in its entirety.

BACKGROUND

Field of Invention

The present invention relates to an unmanned aerial vehicle.

Description of Related Art

In recent years, unmanned aerial vehicles (UAVs) have been widely used in various fields such as aerial photography, surveillance, scientific research, geological survey, and remote sensing. Typically, the UAVs carry onboard a variety of electrical components used to control various aspects of the operation of the UAVs. At the same time, the UAVs sometimes also need to carry one or more sensors for navigational, surveillance or remote sensing purposes. However, the operation of some of such sensors can be affected by interference from the environment (i.e., whether change such as wind or rain), thereby reducing the reliability of such UAVs.

Further, the payload capability, such as size, weight, and power of a battery used in the UAVs, may affect the fly-time of the UAVs. But for now, the fly-time of the UAVs is still limited by the above factors. As a result, there is a need for a UAV with improved reliability by addressing the above-mentioned problems.

SUMMARY

In some embodiments of the present disclosure, an unmanned aerial vehicle (UAV) includes a body, a plurality of rotated propulsion systems, and at least one air bag. The rotated propulsion systems are connected to the body and each includes a blade and an actuator configured to actuate the blade. The air bag is disposed on the body.

In some embodiments of the present disclosure, a method includes lifting an unmanned aerial vehicle (UAV) having a plurality of rotated propulsion systems, in which lifting the UAV comprises inflating an air bag in the UAV; and landing the UAV, wherein landing the UAV comprises deflating the air bag.

One advantage of the present disclosure is that at least one air bag is introduced in an UAV, such that the power consumption of the battery may be decreased, which in turn will facilitate the application of the UAV. Further, an air bag recycling motor is connected to recover the air bag, and thus will improve the storage efficiency and safe time. On the other hand, since the UAV is remotely controlled, which has less safety concerns, a hydrogen gas may be used to inflate the air bag to achieve lower cost.

BRIEF DESCRIPTION OF THE DRAWINGS

The invention can be more fully understood by reading the following detailed description of the embodiment, with reference made to the accompanying drawings as follows:

FIG. 1 is a perspective view of an unmanned aerial vehicle (UAV) in accordance with some embodiments of the present disclosure.

FIGS. 2A and 2B are front view and side view of the UAV of FIG. 1.

FIG. 4A is a side view of the UAV of FIG. 3.

DETAILED DESCRIPTION

Figure 2C:
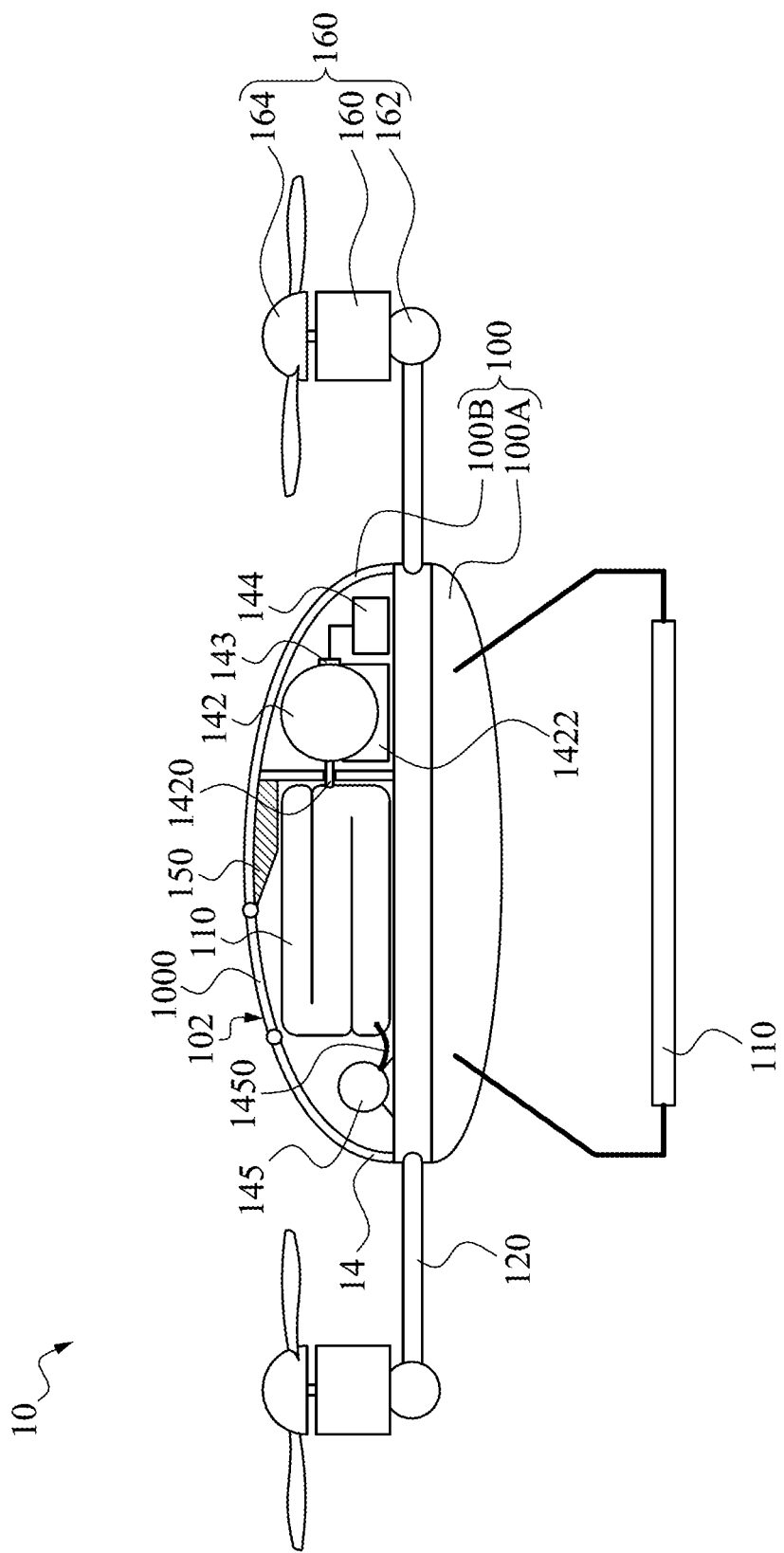
FIG. 2C is a cross-sectional view of FIG. 2B.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a perspective view of an unmanned aerial vehicle (UAV) in accordance with some embodiments of the present disclosure. FIGS. 2A and 2B are front view and side view of the UAV in FIG. 1, and FIG. 2C is a cross-sectional view of FIG. 2B, respectively.

Reference is made to FIGS. 1, 2A, and 2B. An unmanned aerial vehicle (UAV) 10 is provided. In some embodiments, the UAV 10 can also be referred to as drone 10. The UAV 10 includes a flight control system 12, a supplementary flying system 14, and a plurality of rotated propulsion systems 16. The UAV 10 has a body 100, in which the body 100 may include at least a bottom case 100A and a top case 100B. In some embodiments, the flight control system 12 is disposed inside the bottom case 100A of the body 100. The supplementary flying system 14 is disposed inside the top case 100B, which will be discussed in more detail in connection with FIG. 2C. However, the arrangement of the bottom case 100A and the top case 100B is merely used to explain, and the present disclosure is not limited thereto. In some embodiments, the body 100 of the UAV 10 may have an elliptical shape. In some other embodiments, the body 100 can form a substantially spherical, cylindrical shape or any other desired shape. In some embodiments, the case 100A forms a closed space.

In some embodiments, the flight control system 12 disposed in the bottom case 100A may include one or more electrical components adapted to control various aspects of the operation of the UAV 10. For example, such electrical components can include an energy source (e.g., battery), flight control or navigation module, GPS module (e.g., GPS receivers or transceivers), inertial measurement unit (IMU) module, communication module (e.g., wireless transceiver), electronic speed control (ESC) module adapted to control an actuator (e.g., electric motor), actuator(s) such as an electric motor used to actuate a rotor blade or rotor wing of the UAV, electrical wirings and connectors, and/or the like. In some embodiments, some of the electrical components may be located on an integrated electrical unit such as a circuit board or module. One or more electrical units may be positioned inside the cavity.

In some embodiments, the UAV 10 includes a plurality of flying platforms 110 connected to the bottom case 100A of the body 100. However, the present disclosure is not limited thereto, the flying platforms 110 may also be connected to a desired position of the body 100, such as the top case 100B. In some embodiments, the flying platforms 110 can have similar structures. For example, each of flying platforms 110 can have two substantially vertical support portions which are connected by a substantially horizontal connecting portion. However, any suitable configuration of the flying platforms 110 may be employed in some other embodiments.

At least one of the rotated propulsion systems 16 may include an actuator 160, a turning mechanism 162 and a blade 164. The actuator 160 is connected to the blade 164 via a shaft, so as to rotating the blade 164. The actuator 160 can include electric motor, mechanical actuator, hydraulic actuator, pneumatic actuator, and the like. Electric motors can include magnetic, electrostatic, or piezoelectric motors. For example, in some embodiments, the actuator includes a brushless DC electric motor. The rotated propulsion systems 16 may be fixedly or removably coupled to the branches 120.

The turning mechanism 162 is connected to the actuator 160 and is configured to change the direction of the actuator 160. When in use, the blades 164 of UAV 10 are rotated by the actuators 160 so as to drive the UAV 10 moving toward a direction. In some embodiments, the turning mechanism 162 may include a rotating shaft connected to the actuator 160. By using the turning mechanism 162, the rotation plane of the blades 164 may be change to a certain direction, and thus the UAV 10 is able to move toward different directions. Here, the term "rotation plane" is defined as the plane substantially perpendicular to the rotation axis of the blades 164.

In some embodiments, the UAV 10 has at least three rotated propulsion systems 16 to ensure stability of the UAV 10 during operation. For example, four rotated propulsion systems 16 are used in the present embodiment. However, less or more rotated propulsion systems 16 may also be employed in some other embodiments.

The rotated propulsion systems 16 of the UAV 10 are connected to the body 100 by way of a plurality of branches 120. In some embodiments, the branches 120 can be connected to the body 100 in an "X" or star shaped arrangement. Stated another way, the body 100 can be located at the center of the X or star shaped arrangement whereas the branches 120 can be distributed around the body 100, in a symmetric or asymmetric fashion. In some embodiments, such a star-shaped arrangement can facilitate efficient electrical connection between electrical components disposed within the cavity of the housing, such as between a centrally located flight control module and the individual ESC modules located in respective branch cavities. Or between a centrally located energy source (e.g., battery) and actuators (e.g., electric motors) used to drive the rotors of a multi-rotor UAV. In some embodiments, plural wires (not shown) may be arranged inside the cavities of the branches 120 and electrically connects the rotated propulsion systems 16 to the flight control system 12 in the body 100. As such, the rotated propulsion systems 16 may be controlled via the flight control system 12 by the user.

Figure 3:
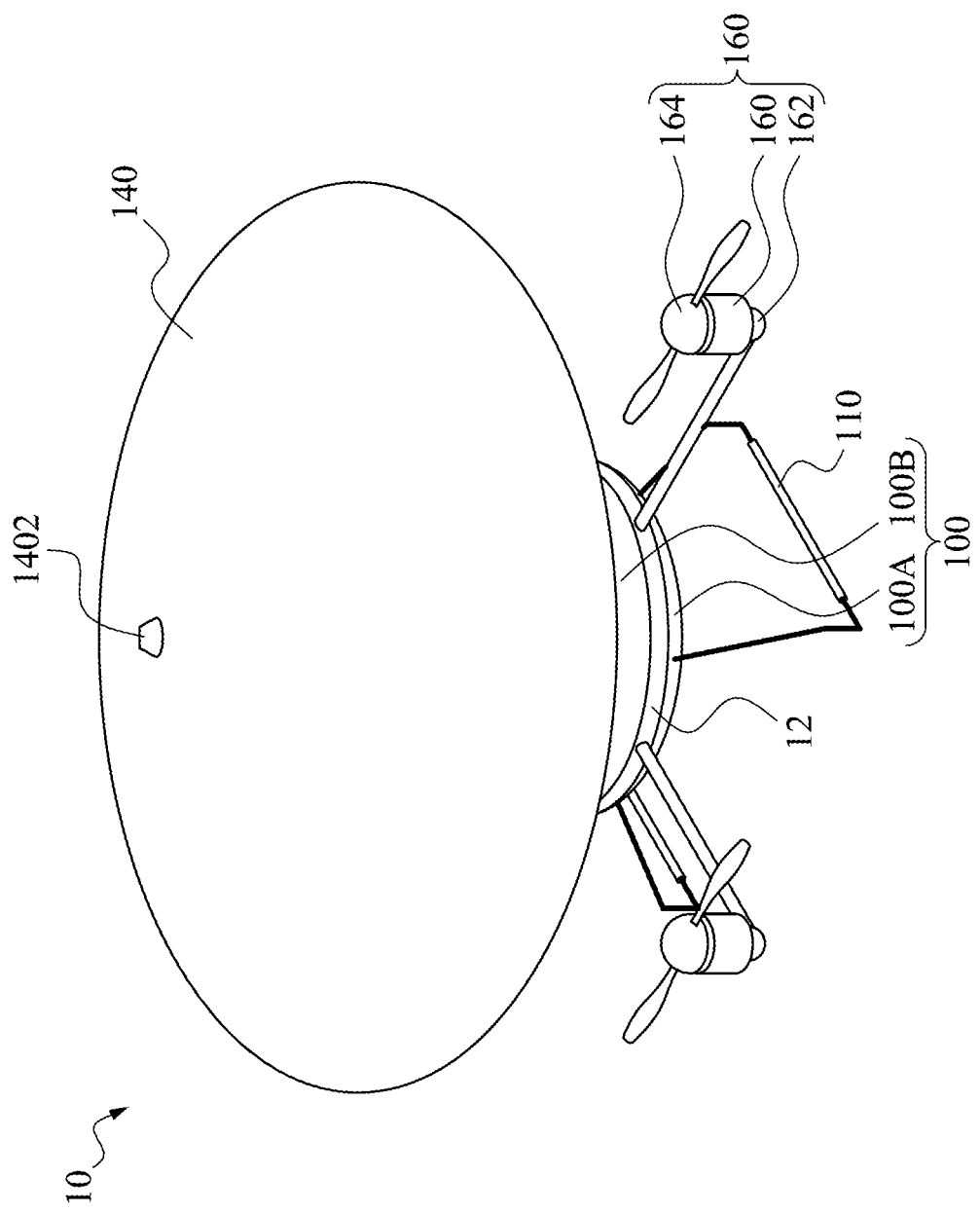
FIG. 3 is a perspective view of an UAV in accordance with some embodiments of the present disclosure.

Reference is made to FIGS. 1, 2A, 2B, and 2C. Referring to FIG. 3, the supplementary flying system 14 of the UAV 10 is discussed in more detail in conjunction with FIGS. 1, 2A, and 2B. As discussed above, the supplementary flying system 14 of the UAV 10 is disposed in the top case 100B of the body 100. In some embodiments, the supplementary flying system 14 include an air bag 140, an air bag recycling motor 141, a gas cylinder 142, an inflation device 143, and a remote control device 144. The gas cylinder 142 is fluidly communicated with the air bag 140, so as to supply a gas from the gas cylinder 142 to inflate the air bag 140. The gas cylinder 142 is connected to the air bag 140 by way of a gas pipe 1420 having sufficient length. Also, the gas cylinder 142 may include a valve where the gas is released into the air bag 140 through the gas pipe 1420.

In some embodiments, the gas cylinder 142 is made of steel. In some other embodiments, the gas cylinder 142 is made of composite materials, such as filament wound composite using carbon fiber held in place with a polymer. Other materials include polymers, such as PET, may also be used. Due to the very high tensile strength of carbon fiber and polymers, these vessels can be very light, and can further reduce the payload of the UAV. In some embodiments, the gas cylinder 142 is built to hold natural gas, such as hydrogen or helium, for transportation applications. Since the UAV 10 is remotely controlled and flies in the air, which has less safety concerns, the gas held in the gas cylinder 142 may be hydrogen, and the cost may be reduced.

In some embodiments, the gas cylinder 142 may be filled with hydrogen and helium in liquid form in a low temperature. In some embodiments where a helium gas is used, the temperature may be lower than 85K. When the liquid hydrogen or helium is released from the gas cylinder 142, the room temperature may heat the hydrogen or helium to change the hydrogen or helium into gas phase, such that the air bag 140 may be inflated. Since the mass of the hydrogen or helium is much lower than the mass of the air, the inflated air bag 140 may be floated via buoyancy.

The gas cylinder 142 may be fixed in the top case 100B via a cylinder support 1422. The cylinder support 1422 may include a latch to fix the gas cylinder 142 in a proper position. The inflation device 143 and the remote control device 144 are electrically connected, and the inflation device 143 is connected to the gas cylinder 142 to trigger the gas cylinder 142 to inflate the air bag 140. In some embodiments, the inflation device 143 may include a pressure sensor, and the gas may be released by the valve operated in response to the control signal from the pressure sensor. The inflation device 143 may also include a controller configured to release the gas from the gas cylinder 142. The remote control device 144 may include signal receiver, such that the inflation device 143 may be remotely controlled through a control signal by the user.

In some embodiments, the supplementary flying system 14 further includes an air bag recycling motor 145. The air bag recycling motor 145 may include a towing rope 1450, in which one end of the towing rope 1450 is connected to the air bag recycling motor 145, and another end of the towing rope 1450 is connected to the air bag 140. The towing rope 1450 is configured to hold the air bag 140 when the air bag 140 is inflated and released outside the top case 100B. Further, the towing rope 1450 may pull the air bag 140 back into the top case 100B by rotating the air bag recycling motor 145. More details will be discussed later.

The top case 100B may include a gate 102. In some embodiments, a door 1000 of the top case 100B is rotatable via a pivot, and may be flipped over the top case 100B to open the gate 102. It is noted that the gate 102 may have a sufficient size for releasing the air bag 140 out of the top case 100B. In some embodiments, the UAV 10 may include a gate trigger controller 150 configured to flip the door 1000 to open the gate 102. The gate trigger controller 150 may include a signal receiver, such that the gate 102 may be remotely opened by the user.

Figure 4B:
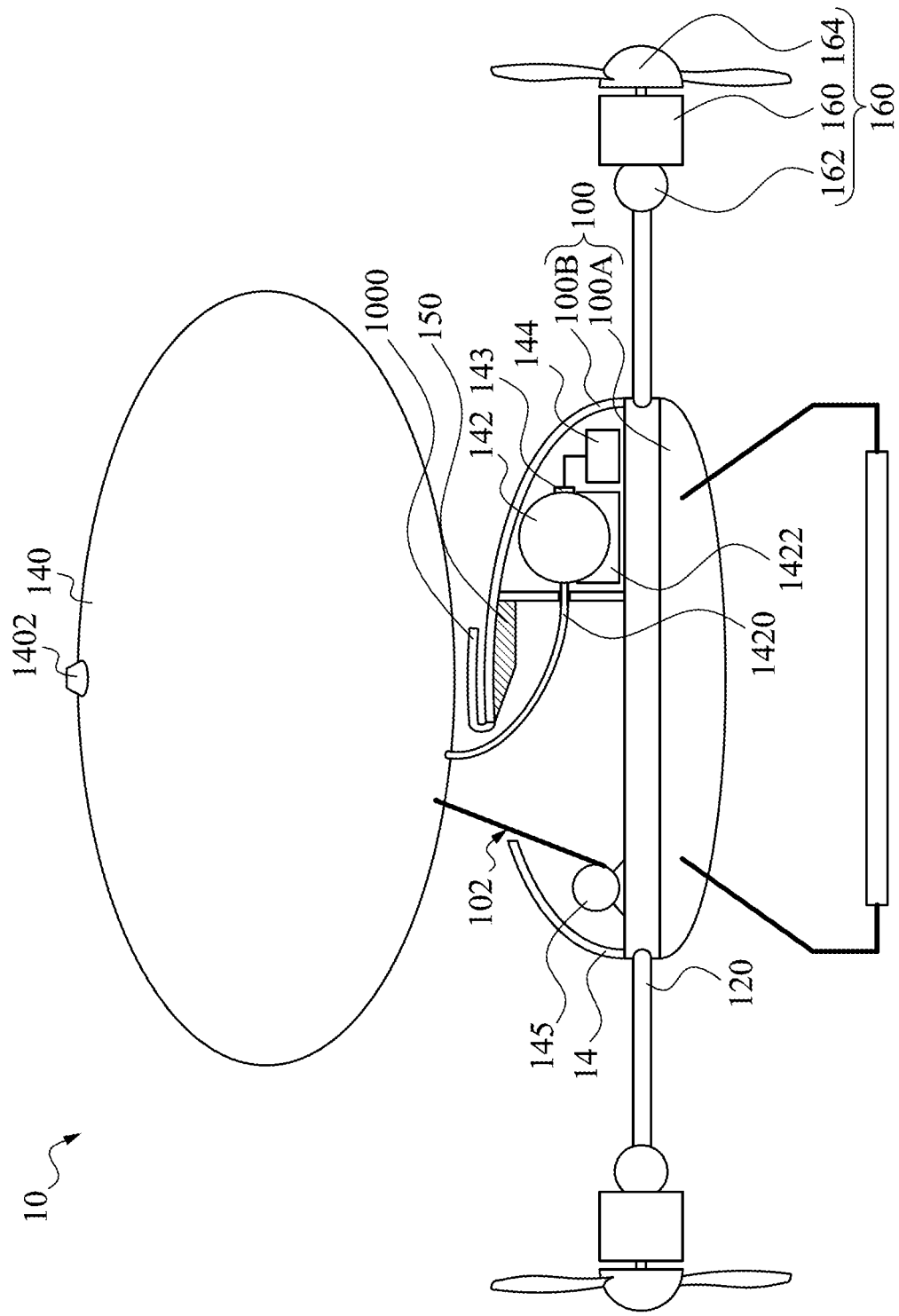
FIG. 4B is a cross-sectional view of FIG. 4A.

Reference is made to FIGS. 3, 4A, and 4B, in which FIG. 4A is a side view of FIG. 3, and FIG. 4B is a cross-sectional view of FIG. 4A. FIG. 3 is similar to FIG. 1, but with the air bag 140 released from the top case 100B of the body 10. In some embodiments, the air bag 140 may be pulled out of the top case 100B manually, and may be inflated by releasing the gas from the gas cylinder 142 into the air bag 140. The gas cylinder 142 may be controlled by the inflation device 143 and the remote control device 144 to import the gas into the air bag 140. In some other embodiments, the air bag 140 may be pulled out of the top case 100B automatically, in which a device (not shown) disposed in top case 100B of the body 10 may push the air bag 140 out of the top case 100B during inflation.

When in use, the air bag 140 is sufficiently inflated to fly the UAV 10. The inflated air bag 140, as illustrated in FIGS. 3, 4A, and 4B, has a volume V. It is noted that the volume V of the air bag 140 should be determined by the weights of the UAV 10. For example, in FIG. 4A where the UAV 10 is floated in the air, the formula of buoyancy can be expressed as:

$$F_B = \gamma V = \rho_{air} g V$$

$F_B$ is the buoyancy of the air bag 140, $\gamma$ is the specific weight of the fluid, $\rho_{air}$ is the density of the air, g is the acceleration of gravity, and V is the volume V of the air bag 140.

For equilibrium state where the UAV 10 is floated in the air, the formula of buoyancy can be expressed as:

$$F_B = W + W_{gas}$$

W is the total weight of the UAV 10, and $W_{gas}$ is the weight of the gas filled in the air bag. Then, the equation can be substituted as followed:

$$\rho_{air} g V = W + \rho_{gas} g V$$

$$V = W/(\rho_{air} - \rho_{gas})g$$

$\rho_{gas}$ is the density of the gas filled in the air bag. As such, the volume V of the air bag 140 may satisfy the equation of $V = W/(\rho_{air} - \rho_{gas})g$.

In some embodiments, the air bag 140 is substantially above the rotated propulsion systems 16. The position of the inflated air bag 140 should be designed such that the inflated air bag 140 should not contact the rotated propulsion systems 16 to prevent damage. In other embodiments, the inflated air bag 140 may be entirely above the rotated propulsion systems 16.

Accordingly, during operation, the inflated air bag 140 provides an upward buoyancy to the UAV 10. On the other hand, the rotated propulsion systems 16 of the UAV 10 may also be operated to provide an upward force to raise the UAV 10 during lifting. The operation time of the rotated propulsion systems 16 depends on the battery capacity. By integrating the inflated air bag 140 into the UAV 10, the power consumption of the battery may be reduced, which in turn will increase the fly time of the UAV 10. Further, by designing the air bag 140 to have a desired volume, it is possible to increase the payload capacity of the UAV 10, and will facilitate the application of the UAV 10.

Figure 5A:
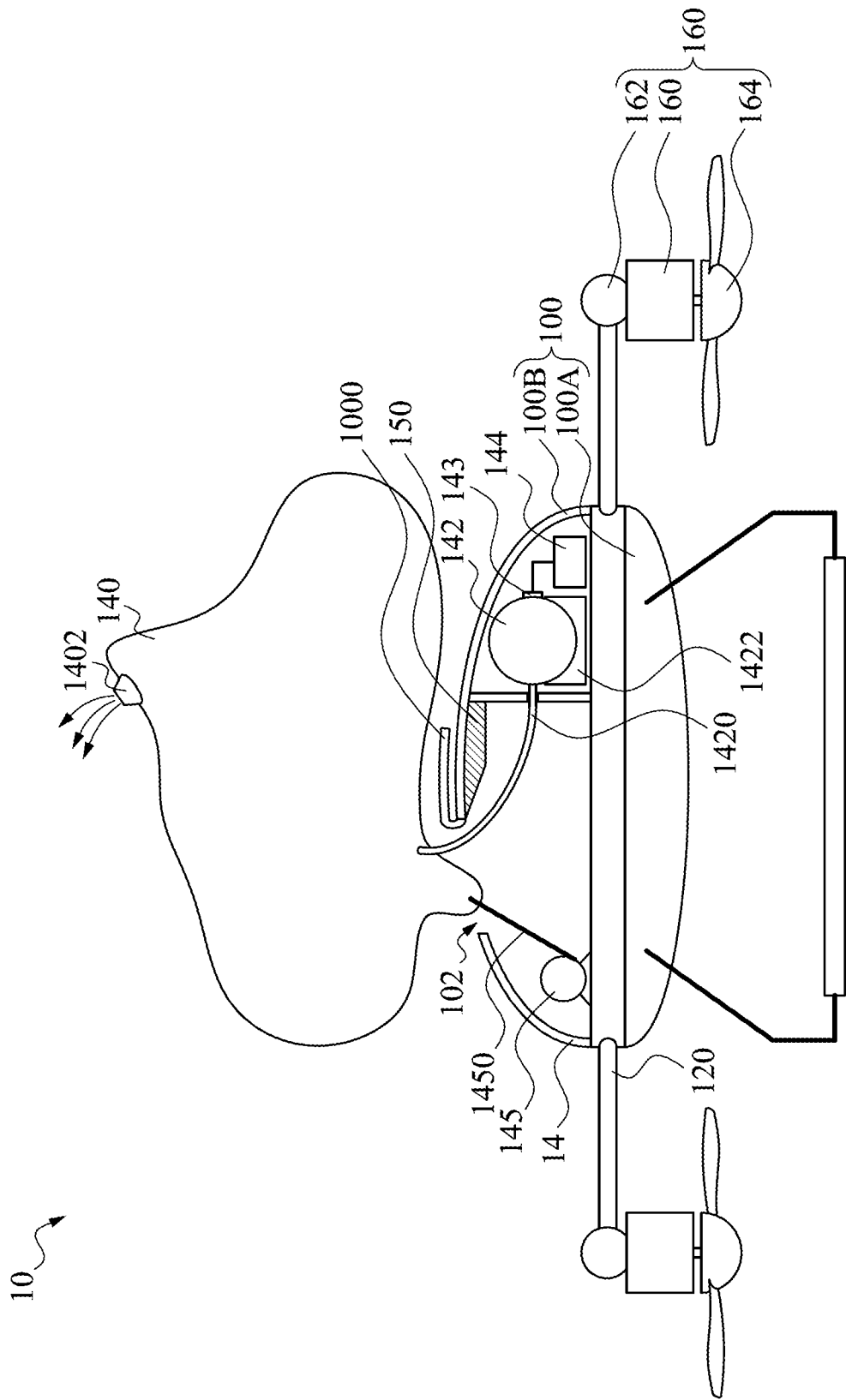
FIGS. 5A and 5B are cross-sectional view of an UAV in accordance with some embodiments of the present disclosure.
Figure 5B:
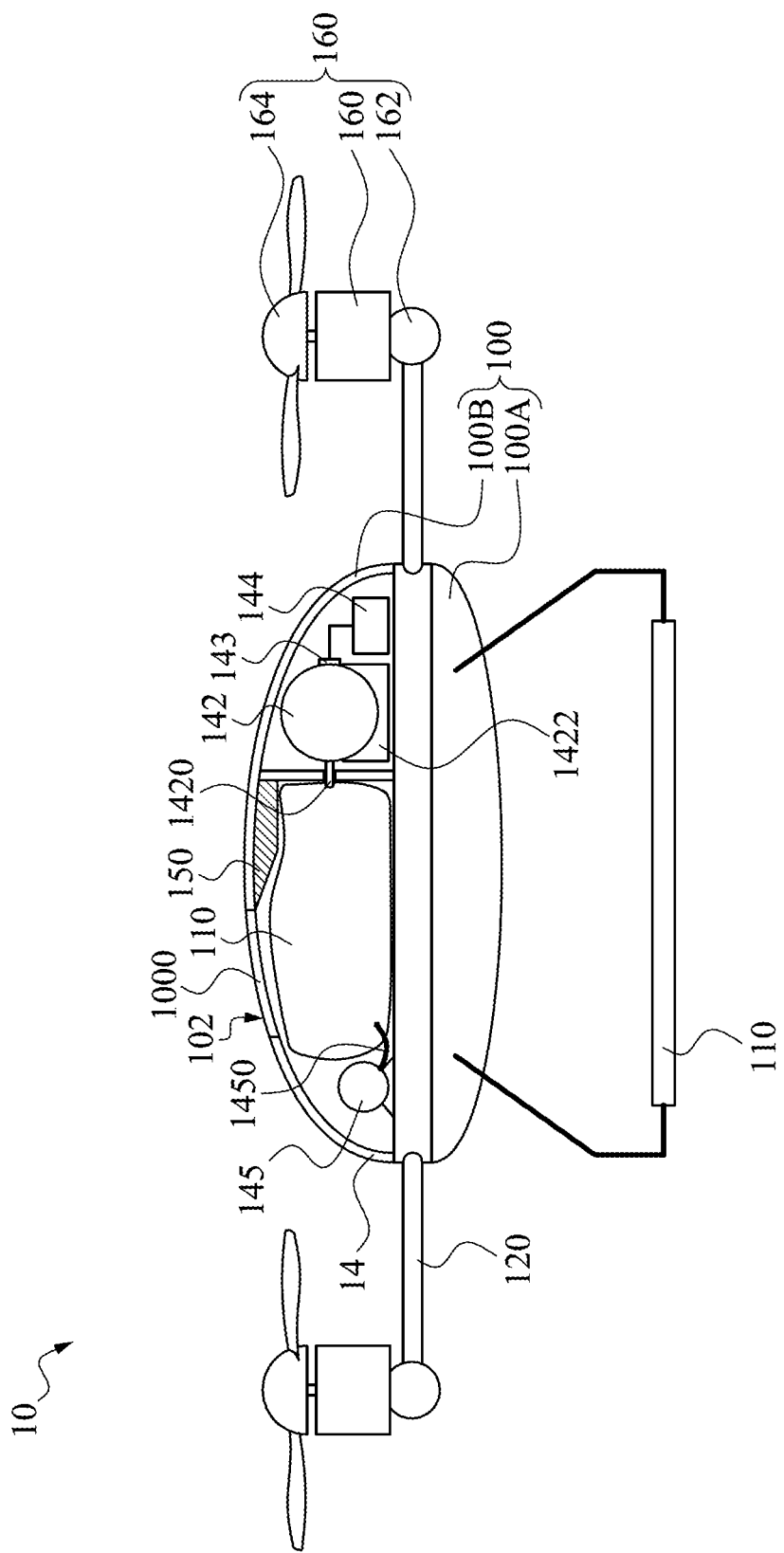

Reference is made to FIGS. 5A and 5B. When the UAV 10 in an operation of landing, the gas in the air bag 140 is released to reduce the buoyancy, so as to move the UAV 10 downwardly. In some embodiments, a gas release valve 1402 is installed on the air bag 140, so as to discharge the gas from the air bag 140. In some embodiments, the gas release valve 1402 is an automatic gas release valve. The gas release valve 1402 may include a signal receiver, such that the gas release valve 1402 can be remotely controlled by the user when the UAV 10 is still flown. For example, the gas release valve 1402 can be remotely controlled when the UAV 10 is about to landing.

In some embodiments when the UAV 10 is still flown in the air and is about to land, the rotation plane of the rotated propulsion systems 16 is changed to a direction that can produce a downward force to move the UAV 10 downwardly during landing, thereby increasing the landing speed. Meanwhile, the gas release valve 1402 may be remotely controlled to discharge the air bag 140.

In some embodiments, during the discharge of the air bag 140, the air bag recycling motor 145 may start to rotate to pull back the air bag 140 into the top case 100B via towing rope 1450. In some other embodiments, the air bag 140 may also be pull back into the top case 100B via the air bag recycling motor 145 after landing. As illustrated in FIG. 5B, the UAV 10 is recovered to its original state once the air bag 140 is pulled back into the top case 100B.

Figure 6A:
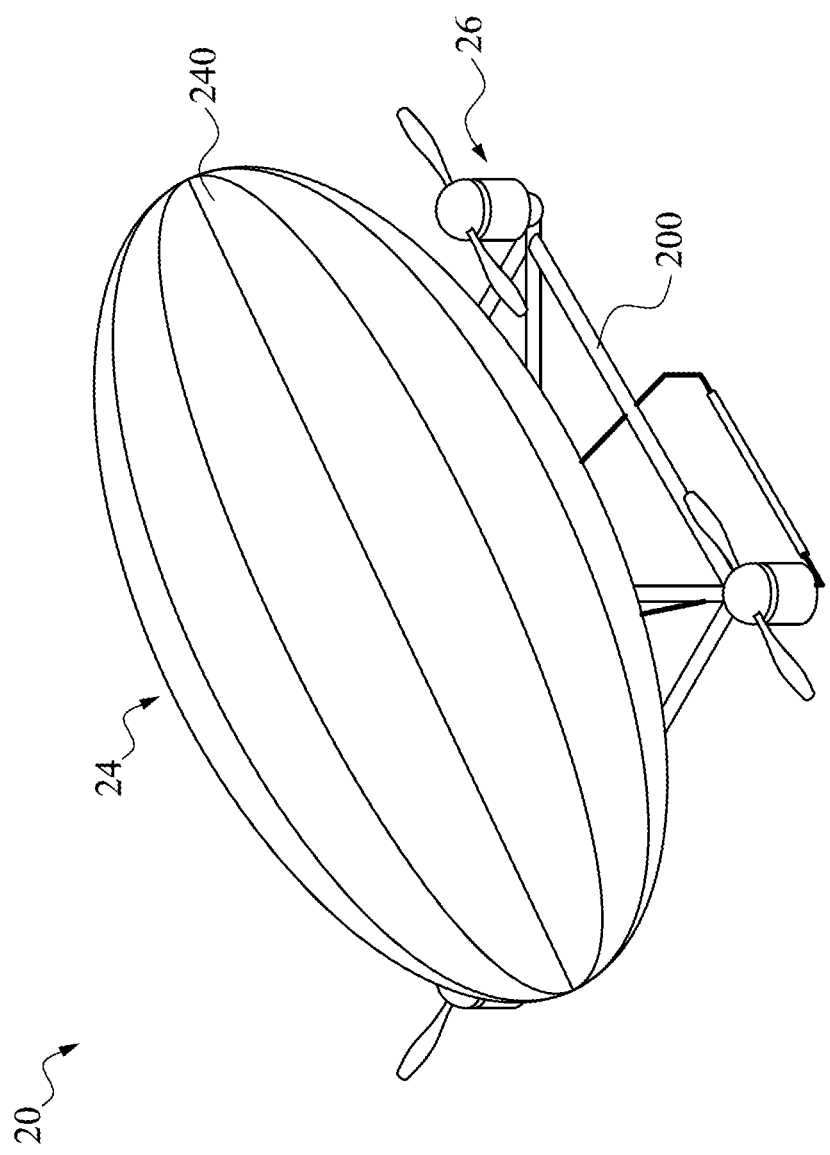
FIG. 6A is a perspective view of an UAV in accordance with some embodiments of the present disclosure.
Figure 6B:
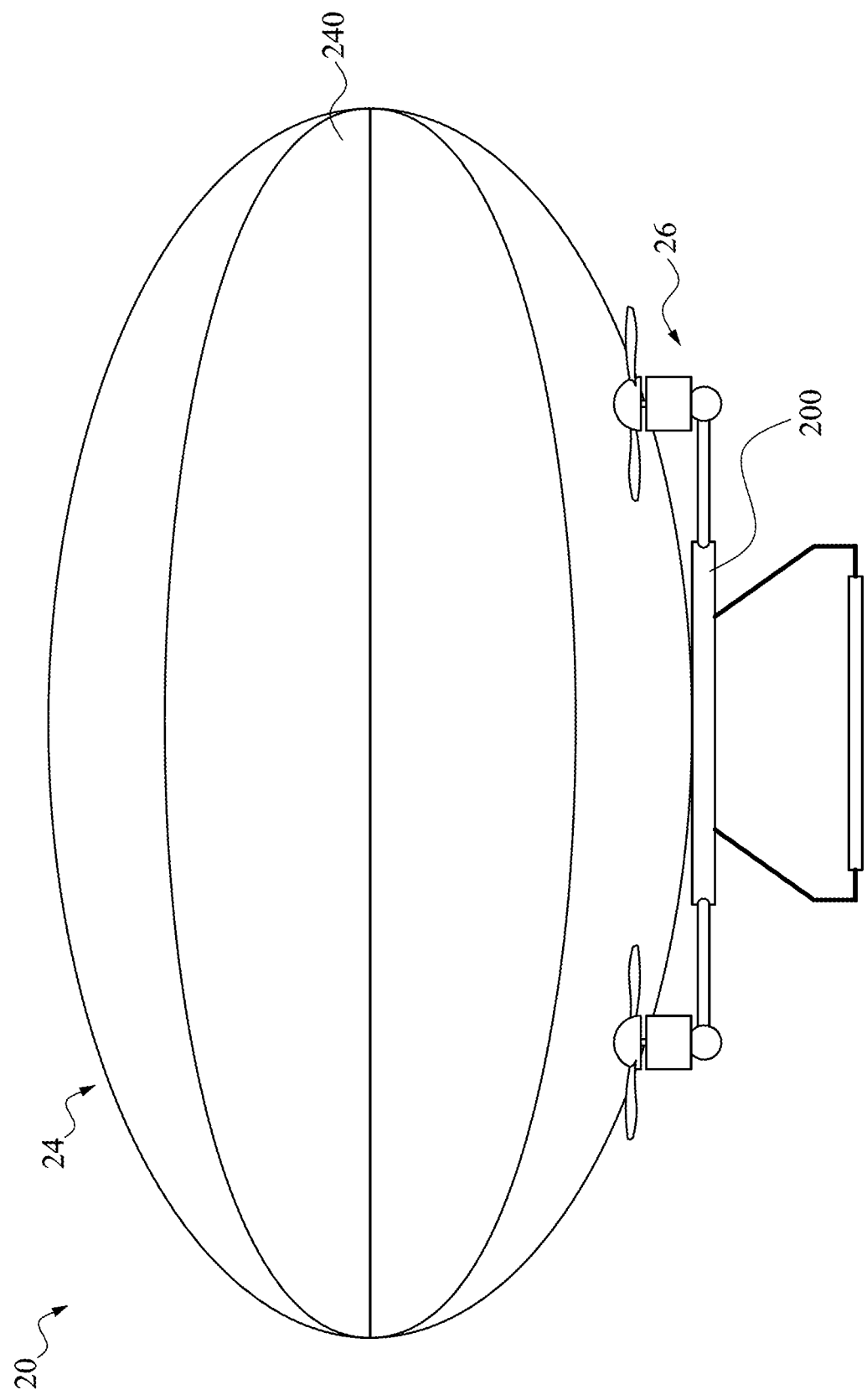
FIG. 6B is a side view of the UAV of FIG. 6A.
Figure 6C:
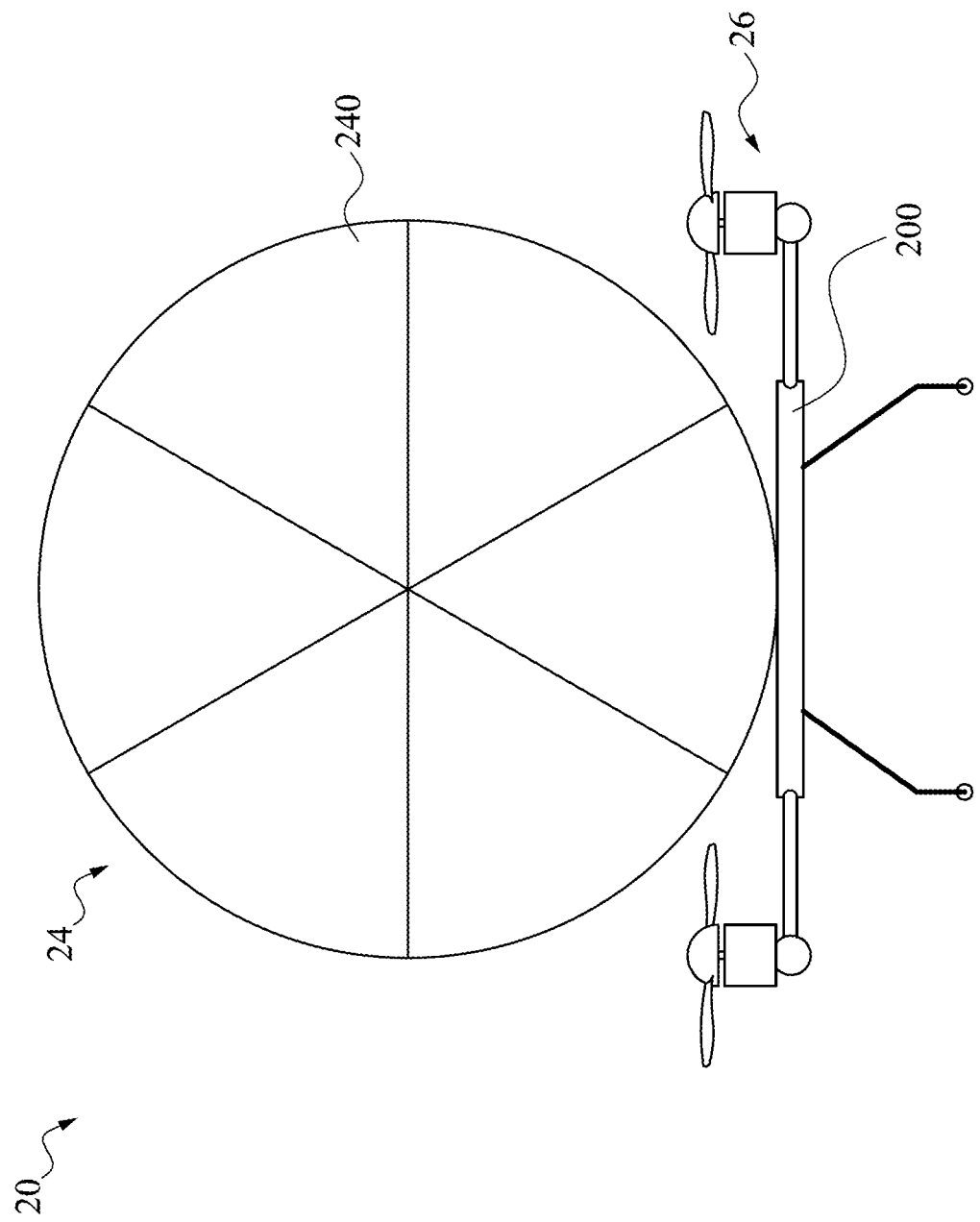
FIG. 6C is a front view of FIG. 6A.

Reference is made to FIGS. 6A to 6C, in which FIG. 6B is a side view of FIG. 6A, and FIG. 6C is a front view of FIG. 6A, respectively. An UAV 20 includes a body 200. In some embodiments, the body 200 includes plural frames connected with each other. Similarly, the UAV 20 may also include a flight control system (not shown) configured in the body 200 of the UAV 20. The flight control system may be the same or similar to the flight control system 12 described in FIGS. 1 to 5B, and will not be repeated for simplicity. The UAV 20 includes rotated propulsion systems 26. The rotated propulsion systems 26 may be the same or similar to the rotated propulsion systems 16 described in FIGS. 1 to 5B, and will not be repeated for simplicity. As illustrated, the rotated propulsion systems 26 are disposed respectively at corners of the body 200, but the present disclosure is not limited thereto.

The UAV 20 includes a supplementary flying system 24. The supplementary flying system 24 may be the same or similar to the supplementary flying system 14 described in FIGS. 1 to 5B, and will not be repeated for simplicity. It is noted that some elements of the supplementary flying system 14 in FIGS. 1 to 5B (e.g., elements 140 to 145) are not illustrated in FIG. 6A to 6C for clarity. The supplementary flying system 24 may include an air bag 240. Different from the embodiments described in FIG. FIGS. 1 to 5B, the air bag 240 is exposed from the body 200 whether it is inflated or deflated. It is noted that when the air bag 240 is inflated, the position of the air bag 240 should be designed to bypass the rotated propulsion systems 26 to prevent damage.

Figure 7A:
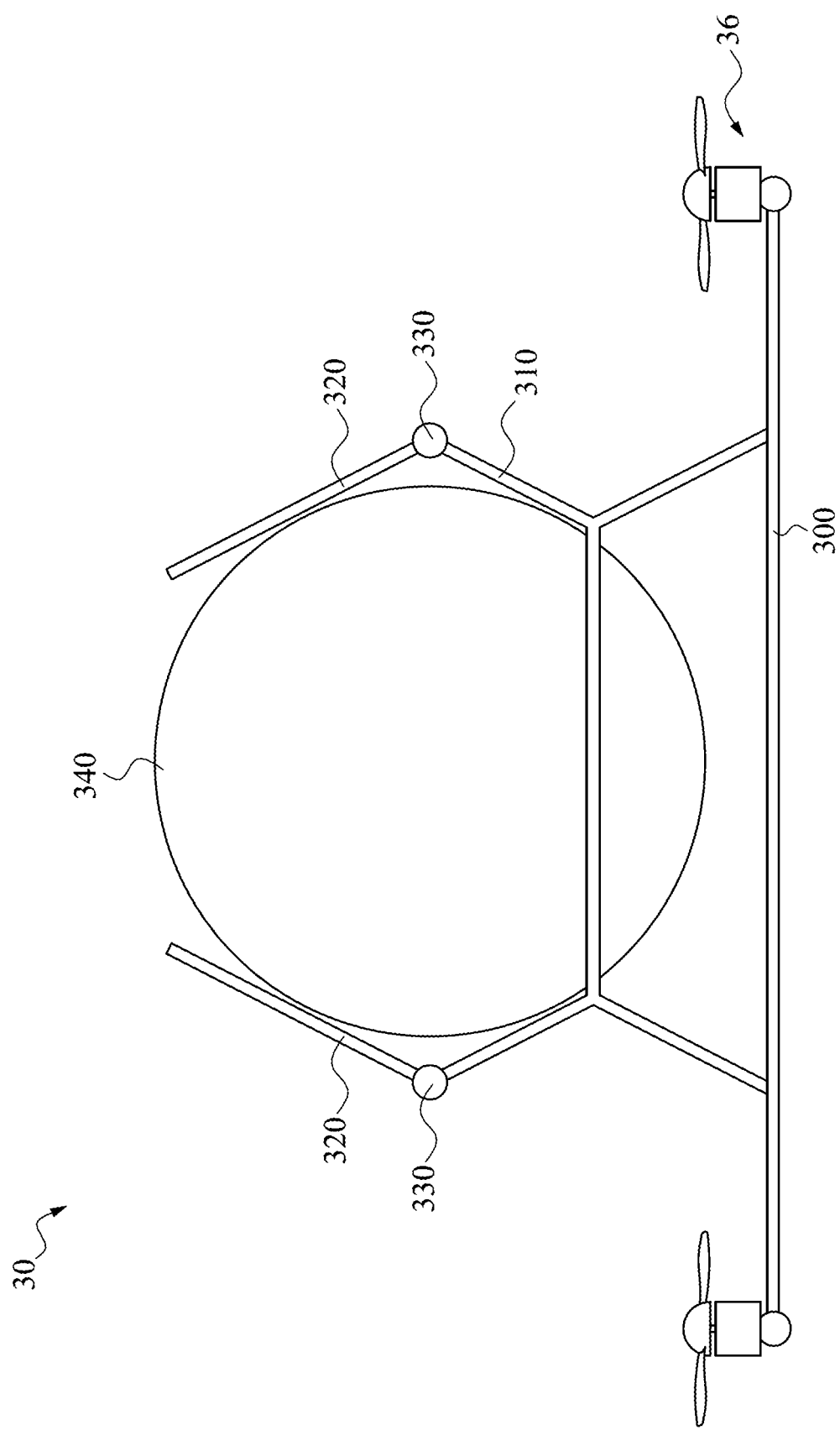
FIGS. 7A and 7B are cross-sectional view in accordance with some embodiments of the present disclosure.
Figure 7B:
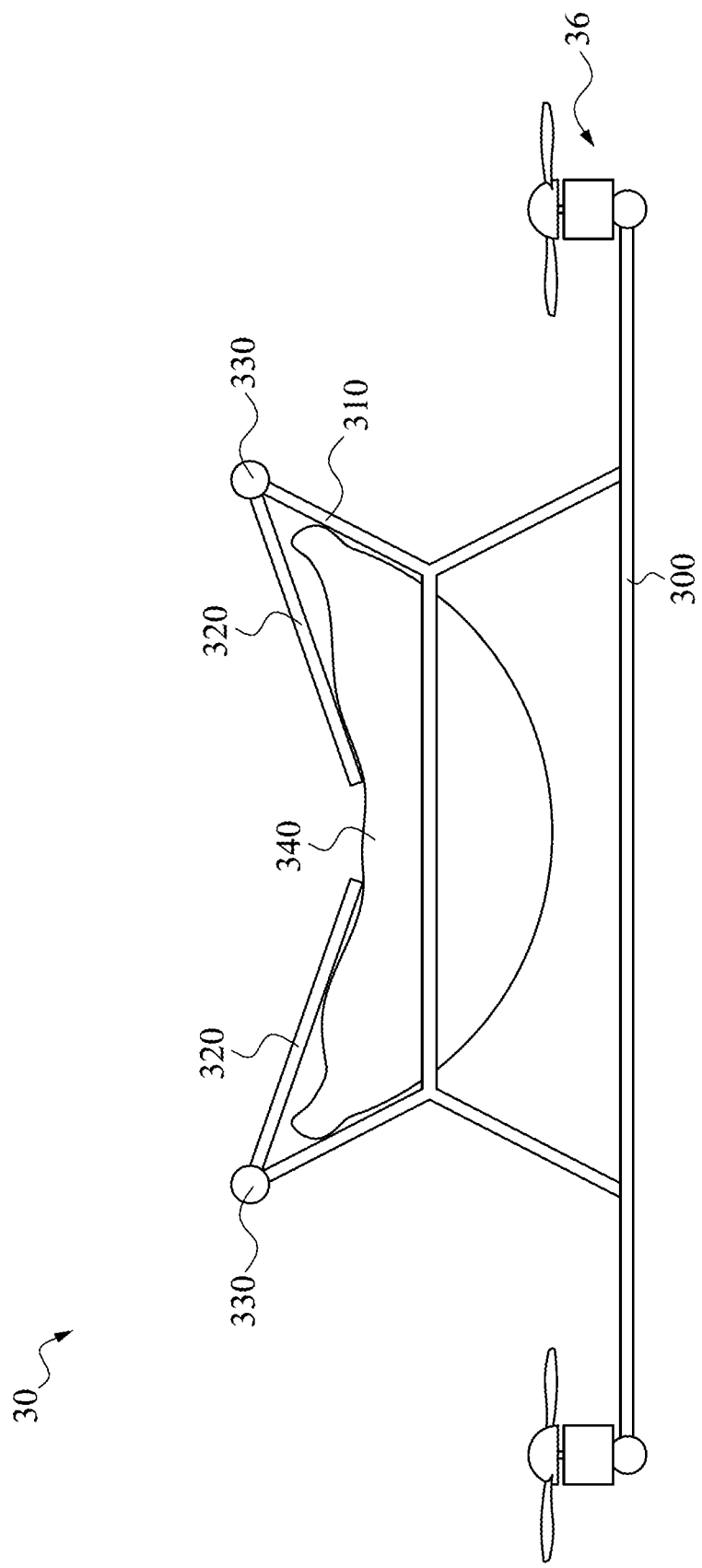

Reference is made to FIGS. 7A and 7B, in which FIGS. 7A and 7B are cross-sectional view of an UAV in accordance to embodiments of the present disclosure. Similar to the embodiments described above, an UAV 30 may include a flight control system, a supplementary flying system, and a plurality of rotated propulsion systems 36, as described above, and relevant descriptions in this aspect will not be repeated. In FIG. 7A, the UAV 30 includes a body 300, and the rotated propulsion systems 36 are disposed at the rear of the body 300. In some embodiments, a support frame 310 is disposed on the body 300, in which an air bag 340 of the supplementary flying system may be supported by the support frame 310. At least one cover 320 is disposed on the support frame 310 through a pivot 330, such that the cover 320 is rotatable through the pivot 330. In the present embodiment, two covers 320 are illustrated, but less or more covers 320 may also be employed in other embodiments.

In some embodiments, the supplementary flying system includes an air bag 340 disposed in the support frame 310. When the air bag 340 is inflated, as shown in FIG. 7A, the covers 320 may attach the surface of the air bag 340, so as to provide sufficient protectivity during flying. Further, since the covers 320 are rotatable, the covers 320 may be flexibly opened to a certain angle according to the size of the air bag 340. In FIG. 7B where the air bag 340 is deflated, the covers 320 may rotate inwardly and cover the deflated air bag 340.

Figure 8A:
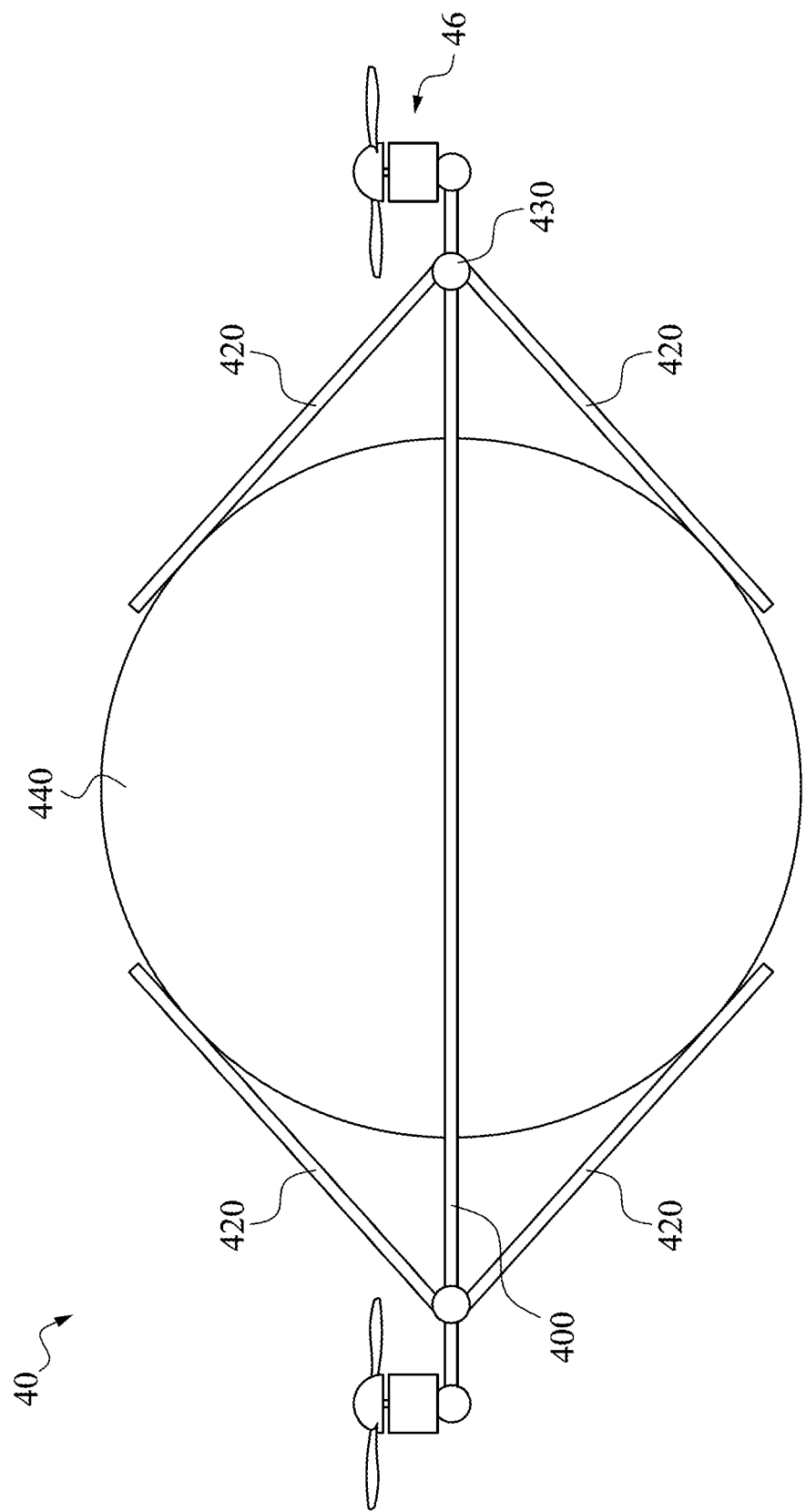
FIGS. 8A and 8B are cross-sectional view in accordance with some embodiments of the present disclosure.
Figure 8B:
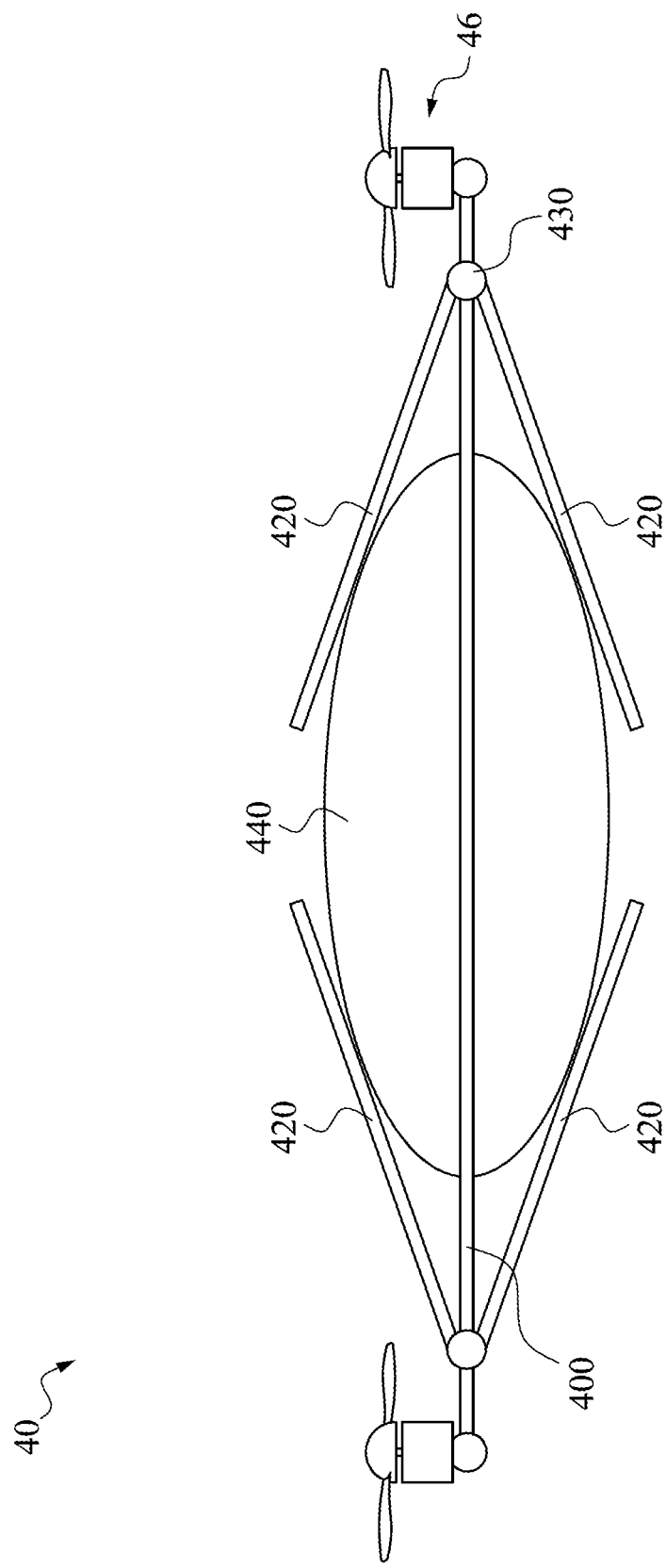

Reference is made to FIGS. 8A and 8B, in which FIGS. 8A and 8B are cross-sectional view of an UAV in accordance to embodiments of the present disclosure. Similar to the embodiments described above, an UAV 40 may include a flight control system, a supplementary flying system, and a plurality of rotated propulsion systems 46, as described above, and relevant descriptions in this aspect will not be repeated. In FIG. 8A, the UAV 40 includes a body 400, and the rotated propulsion systems 46 are disposed at the rear of the body 400. An air bag 440 of the supplementary flying system may be disposed in the body 400. In FIG. 8A when the air bag 440 is inflated, the air bag 440 is substantially arranged in the body 400. In some embodiments, the upper half portion of the inflated air bag 440 is substantially above the body 400, and the lower half portion of the inflated air bag 440 is substantially below the body 400, respectively. Stated another way, the inflated air bag 440 substantially, from top to down, crosses the body 400. In some embodiments, the upper half portion of the inflated air bag 440 is substantially above the rotated propulsion systems 46, and the lower half portion of the inflated air bag 440 is substantially below the rotated propulsion systems 46, respectively.

Plural covers 420 are disposed on the body 400 through pivot 430, such that the covers 420 are rotatable through the pivots 430. In the present embodiment, two covers 420 are disposed above the body 400, and two covers 420 are disposed below the body 400, respectively. In some embodiments when the air bag 440 is inflated, as shown in FIG. 8A, the covers 420 may attach the surface of the air bag 440, so as to provide sufficient protectivity during flight. Further, since the covers 420 are rotatable, the covers 420 may be flexibly opened to a certain angle according to the size of the air bag 440. In FIG. 7B when the air bag 440 is deflated, the covers 420 may rotate inwardly and cover the deflated air bag 440.

Figure 9:
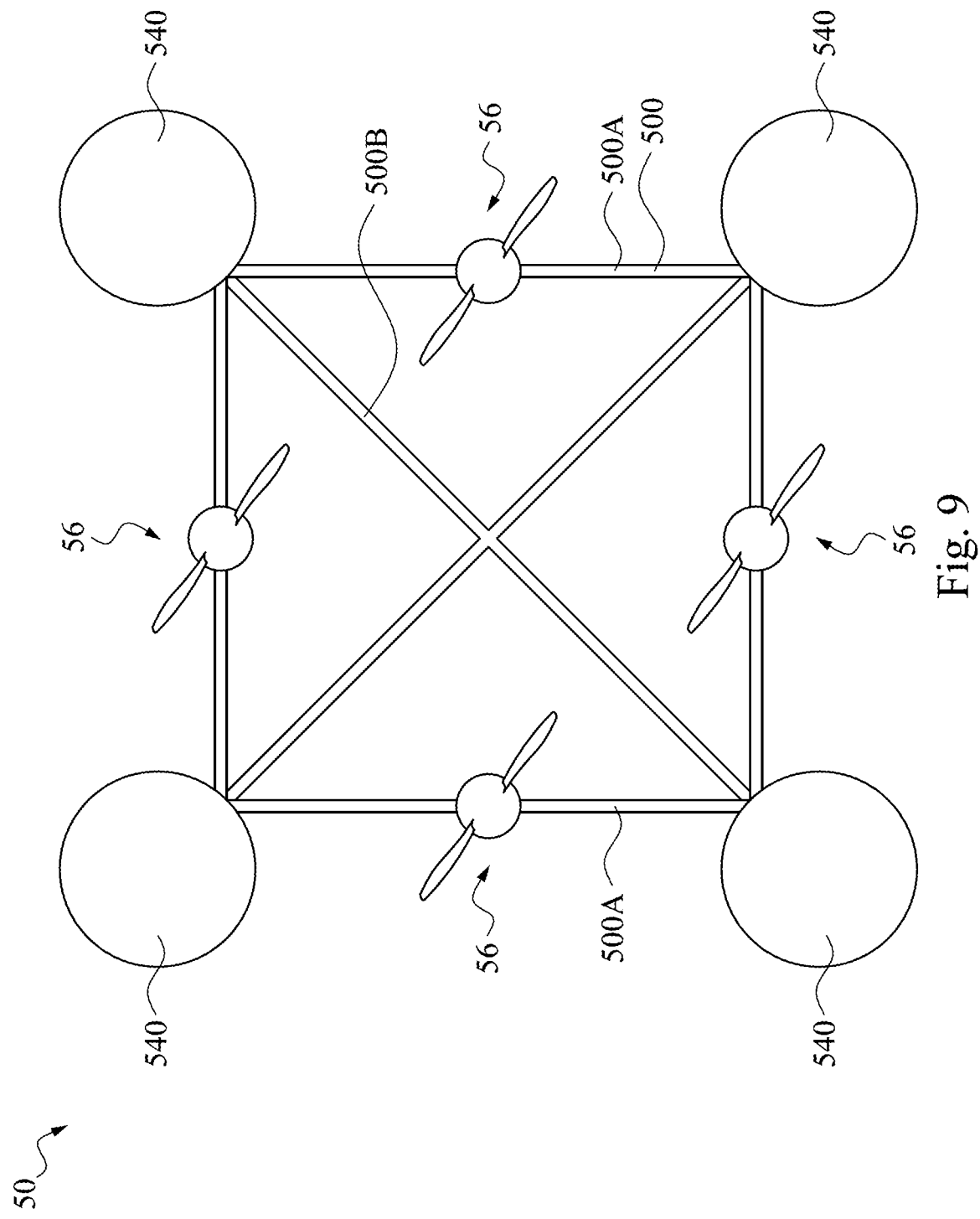
FIG. 9 is a top view of an UAV in accordance with some embodiments of the present disclosure.

Reference is made to FIG. 9, in which FIG. 9 is a top view of an UAV in accordance to embodiments of the present disclosure. Similar to the embodiments described above, an UAV 50 may include a flight control system, a supplementary flying system, and a plurality of rotated propulsion systems 56, as described above, and relevant descriptions in this aspect will not be repeated. The UAV 50 includes a body 500 having a plurality of frames 500A and 500B, in which the frames 500A intersect with each other to form a rectangular structure. In addition, the frame 500B is disposed in the frames 500A and is connected to the corners of the rectangular structure.

In some embodiments, the rotated propulsion systems 56 are disposed at the sides of the rectangular structure of the body 500. For example, each of the rotated propulsion systems 56 is disposed at the middle of each frame 500A. Further, plural air bags 540 are disposed at the corners of the rectangular structure of the body 500. In the present embodiments, since the rectangular structure of the body 500 includes four corners, the number of the air bags 540 is four. It is noted that when the air bags 540 are inflated, the position of the air bags 540 should be designed to bypass the rotated propulsion systems 56.

According to the aforementioned embodiments, it can be seen that the present disclosure offers advantages over UAVs. It is understood, however, that other embodiments may offer additional advantages, and not all advantages are necessarily disclosed herein, and that no particular advantage is required for all embodiments. One advantage is that at least one air bag is introduced in an UAV, such that the power consumption of the battery may be decreased, which in turn will facilitate the application of the UAV. Further, an air bag recycling motor is connected to recover the air bag, and thus will improve the storage efficiency and safe time. On the other hand, since the UAV is remotely controlled, which has less safety concerns, a hydrogen gas may be used to inflate the air bag to achieve lower cost.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An unmanned aerial vehicle (UAV), comprising:
a body comprising a case having a door;
a plurality of rotated propulsion systems connected to the body and each comprising a blade and an actuator configured to actuate the blade;
at least one air bag disposed in the case of the body, wherein the air bag is configured to move out of the case through the door;
an air bag recycling motor disposed in the case; and
a towing rope connecting the air bag to the air bag recycling motor.

2. The UAV of claim 1, further comprising a gas cylinder connected to the air bag.

3. The UAV of claim 1, further comprising a trigger controller connected to the door, wherein the trigger controller is configured to open the door.

4. The UAV of claim 1, further comprising:
an inflation device connected to the air bag; and
a remote control device electrically connected to the inflation device.

5. The UAV of claim 1, wherein each of the rotated propulsion systems further comprises:
a turning mechanism connected to the actuator, wherein the turning mechanism is configured to move the blade.

6. The UAV of claim 1, wherein the at least one air bag comprises a plurality of air bags.

7. The UAV of claim 6, wherein the body is in a rectangular shape, and the air bags are disposed at corners of the rectangular body, respectively.

8. The UAV of claim 7, wherein each of the rotated propulsion systems are disposed between the air bags at the corners of the rectangular body.

9. The UAV of claim 1, wherein the at least one air bag comprises a plurality of air bags, and a number of the air bags is equal to a number of the rotated propulsion systems.

10. The UAV of claim 1, wherein an upper half portion of the air bag is above the rotated propulsion systems, and a lower half portion of the air bag is below the rotated propulsion systems when the air bag is inflated.

11. The UAV of claim 1, further comprising:
a plurality of covers; and
a plurality of pivots connecting the covers to the body, wherein the covers abut against a surface of the at least one air bag when the air bag is inflated.

12. The UAV of claim 10, wherein portions of the covers are above the body, and other portions of the covers are below the body, respectively.

13. The UAV of claim 1, further comprising a support frame disposed on the body, wherein the air bag is supported by the support frame.

14. A method, comprising:
lifting an unmanned aerial vehicle (UAV) having a plurality of rotated propulsion systems, wherein lifting the UAV comprises inflating an air bag in the UAV;
landing the UAV, wherein landing the UAV comprises deflating the air bag; and
operating an recycling motor to pull back the air bag into a case of the UAV, wherein a towing rope connects the air bag to the recycling motor.

15. The method of claim 14, wherein lifting the UAV further comprises operating the rotated propulsion systems in the UAV to provide an upward force to the UAV.

16. The method of claim 14, wherein landing the UAV further comprises operating the rotated propulsion systems in the UAV to provide a downward force to the UAV.

17. The method of claim 14, wherein deflating the air bag comprises remotely controlling a gas release valve of the air bag.

* * * * *